United States Patent [19]

Kaliardos

[11] 3,959,530

[45] May 25, 1976

[54] CLEANING AND PROTECTIVE COATING COMPOSITION AND METHOD

[76] Inventor: Nicolas Kaliardos, 10725 Morang Ave., Detroit, Mich. 48224

[22] Filed: Sept. 20, 1974

[21] Appl. No.: 507,851

Related U.S. Application Data

[63] Continuation-in-part of Ser. No. 319,851, Dec. 29, 1972, abandoned.

[52] U.S. Cl. .................................. 427/341; 106/3; 106/4; 106/5; 106/6; 106/7; 106/8; 106/9; 106/10; 106/11; 427/154; 427/155; 427/156
[51] Int. Cl.$^2$ ...................... B05D 3/10; C09G 1/08
[58] Field of Search .............................. 106/3–11; 117/62, 168; 427/154–156, 341

[56] References Cited
UNITED STATES PATENTS 2,884,329   4/1959   Jezl ...................................... 106/10
3,365,312   1/1968   Nowack .................................. 106/3
3,582,366   6/1971   Brieger ................................ 106/10

OTHER PUBLICATIONS

Chemical Dictionary, 1961, p. 465.
Chemical Abstract, 66: 19.976g.

*Primary Examiner*—Ronald H. Smith
*Assistant Examiner*—Janyce A. Bell
*Attorney, Agent, or Firm*—Barnes, Kisselle, Raisch & Choate

[57] ABSTRACT

A waxing and protective coating composition embodying the invention comprises a mixture of wax residue such as paraffin and microcrystalline wax, chlorinated solvent, petroleum distillate, and a nonionic surfactant such as nonylphenoxypoly-(ethyleneoxy)ethanol and a small amount of [N,N,N',N'-tetrakis (2-hydroxypropyl)ethylenediamine].

6 Claims, No Drawings

CLEANING AND PROTECTIVE COATING COMPOSITION AND METHOD

This patent application is a continuation-in-part of my application Ser. No. 319,851, filed Dec. 29, 1972, now abandoned.

This invention relates to cleaning and protective coating compositions and to a method for protecting the finishes of articles and particularly the finishes of automobiles.

BACKGROUND OF THE INVENTION

In protecting the finishes of articles such as paint finishes, chrome plating, glass, and the like, it is common to utilize separate cleaning and waxing compositions. Such separate compositions require individual steps of application, removal and buffing or smoothing.

Among the objects of the present invention are to provide a composition for cleaning and protectively coating finishes such as those of automobiles and a method of applying such composition which requires a minimum of labor, which has rust inhibiting properties; which obviates the need for extensive rubbing or buffing; which protects the surface for a long period of time against atmospheric conditions; and which minimizes the cost of both the composition and labor involved.

DESCRIPTION

Basically, the waxing and protective coating composition embodying the invention comprises a mixture of wax residue such as paraffin and microcrystalline wax, chlorinated solvent, petroleum distillate, and a non-ionic surfactant such as nonylphenoxypoly(ethyleneoxy)ethanol and a small amount of [N,N,N',N'-tetrakis(2-hydroxypropyl) ethylenediamine].

The wax residue is preferably a mixture of paraffin and microcrystalline waxes. The terms paraffin wax and microcrystalline wax are well understood in the wax art. A typical paraffin wax is of the type made by Shell Chemical Company and sold under the trademark SHELLWAX 100 having the following properties:

|  | ASTM Test Method | 100 |
|---|---|---|
| Melt Point, °F | D-87 | 125 |
| Color, Saybolt | D-156 | +30 |
| Flash Point, C.O.C., °F | D-92 | 405 |
| Penetration, Needle | D-1321 | |
| at 77°F | | 13 |
| at 100°F | | 70 |
| at 110°F | | 90 |
| Oil Content, % Wt. | D-721 | 0.1 |
| Tensile Strength, p.s.i. at 73°F | D-1320 | 275 |
| Gradient Block Pt., (Pick/Block) °F | D-1465 | 93/94 |
| Refractive Index at 100°C | D-1747 | 1.4180 |
| Lbs./Gal. | | |
| at 60°F | | 7.59 |
| at 210°F | | 6.29 |

Another type of paraffin wax which has been used successfully is made by Mobile Oil Corporation and sold under the designation 133/135 having the following properties:

| FULLY REFINED WAXES | 133/135 AMP |
|---|---|
| Color, Saybolt | +30 |
| Viscosity at 210°F, SUS | 39 |
| Melting Point, °F ASTM | 131 |
| Blocking Point, °F | 101 |
| Flash Point, °F COC | 430 |
| Tensile Strength (T.O.)psi | 330 |
| Oil Content,% by Wt. | 0.2 |
| Lbs/Gal at 160°F (Liquid) | 6.41 |
| Lbs/Gal at 60°F (Solid) | 7.62 |

A typical microcrystalline wax is sold by Shell Chemical Company under the trademark SHELLMAX 500 and has the following properties:

|  | ASTM Test Method | 500 |
|---|---|---|
| Melt Point, °F | D-127 | 141 |
| Color, ASTM | D-1500 | Lt.2.0 |
| Flash Point, C.O.C., °F | D-92 | 565 |
| Penetration, Needle | D-1321 | |
| at 77°F | | 21 |
| at 100°F | | 52 |
| at 110°F | | 125 |
| Oil Content,% Wt. | D-721 | 0.9 |
| Refractive Index at 100°C | D-1747 | 1.4440 |
| Lbs./Gal. | | |
| at 60°F | | 7.75 |
| at 210°F | | 6.67 |

Another microcrystalline wax that has given satisfactory results is made by Mobile Oil Corporation and sold under the trademarks Mobilwax 2305 and Mobilwax 2305 BR having the following properties:

|  | Mobilwax 2305 | Mobilwax 2305 BR |
|---|---|---|
| Melting Point. °F (ASTM-127) | 176 | 176 |
| Color, ASTM | 2 | 2.5 |
| Viscosity at 210°F, SUS | 86 | 160 |
| Needle Penetration | | |
| at 77°F | 27 | 27 |
| at 108°F | 95 | 95 |
| at 115°F | 130 | 130 |
| Oil Content, % | 4.0 | 4.0 |
| Flash Point, °F (COC) | 540 | 540 |
| Wgt./Gal.lbs at 180°F | 6.71 | 6.71 |
| Wgt./Gal.lbs at 60°F | 7.74 | 7.74 |

Chlorinated Solvent may comprise any one of the number of well-known solvents such as perchloroethylene.

A typical perchloroethylene is such as sold by The Dow Chemical Company under the designation "Special Vapor Degreasing Grade" having the following specifications and properties:

| SPECIFICATION* | |
|---|---|
| Appearance | Clear, free of sediment and suspended matter |
| Color APHA, Maximum | 15 |
| Distillation Range, at 760, IBP-DP | 118–122°C |
| Water Content, Maximum Karl Fischer Method, ppm | 30 ppm |
| Non Volatile Matter, Maximum | 25 ppm |
| Free Halogens, Maximum | none |
| Acidity (as HCl) Maximum | none |
| Alkalinity (as NaOH) Maximum | 30 ppm |
| Specific Gravity at 25/25°C | 1.614–1.622 |
| Acid Acceptance (as NaOH) | |
| by Titration | 0.149–0.176 |
| By Calculation | 0.156–0.190 |
| Stability with Copper | Passes test |

PROPERTIES

| | |
|---|---|
| Freezing Point | −9°F(−23°C) |
| Pounds per gallon at 25°C | 13.47 |
| Refractive index at 25°C | 1.503 |
| Viscosity at 25°C, centipoises | 0.84 |
| Flash Point | none |
| Fire Point | none |
| Heat of vaporization at b.p.: | |
| Cal./g | 50.1 |
| BTU/lb. | 90.2 |
| Specific Heat, cal./g°C | 0.21 |

*Dow Method of Analysis 59015

The petroleum distillate may be one of the various types preferably having a boiling point ranging from 350° to 380°F.

A typical petroleum distillate is generally known in the trade as Solvent 140. For example, such a solvent is sold by Shell Chemical Company under the designation Shell Sol 140 having the following properties:

| PROPERTY | TEST METHOD | Shell Sol 140 |
|---|---|---|
| Specific Gravity at 60°F | ASTM D-1250 | 0.786 |
| Gravity, °API | ASTM D-287 | 48.5 |
| Pounds per Gallon at 60°F | ASTM D-1250 | 6.55 |
| Color, Saybolt | ASTM D-156 | +30 |
| Kauri-Butanol Number | ASTM D-1133 | 31 |
| Aniline Point, °F | ASTM D-611/D1012 | 155 |
| Mixed Aniline Point °F | ASTM D-611/D-1012 | — |
| Flash Point, T.C.C.,°F | ASTM D-56 | 141 |
| Distillation, °F | ASTM D-86 | |
| IBP | | 370 |
| 10% Recovered | | 371 |
| 30% | | 372 |
| 50% | | 373 |
| 70% | | 375 |
| 90% | | 378 |
| Dry Point | | — |
| End Point | | 408 |
| Evaporation Rate,Seconds | Shell Evapo-Rater | |
| 10% | | 1050 |
| 30% | | 3230 |
| 50% | | 5470 |
| 70% | | 7830 |
| 90% | | 10400 |
| 100% | | 13700 |
| Composition, % Volume | | |
| Paraffins | | 48.4 |
| Naphthenes | | 47.7 |
| Aromatics(total) | | 3.9 |
| Toluene plus Ethyl Benzene | | 0.0 |
| $C_8$ plus Aromatics excluding EB | | 3.9 |

A similar solvent is sold by Grow Solvent Company, Inc., under the designation Solvent GS 140 and has the following properties:

A.S.T.M. DISTILLATION:

| | | |
|---|---|---|
| I.B.P. | 363°F | 183.0°C |
| 5% | 366 | 185.6 |
| 10% | 367 | 186.1 |
| 20% | 368 | 186.7 |
| 30% | 369 | 187.2 |
| 40% | 370 | 187.8 |
| 50% | 371 | 188.3 |
| 60% | 372 | 188.9 |
| 70% | 373 | 189.4 |
| 80% | 374 | 190.0 |
| 90% | 376 | 191.1 |
| 95% | 379 | 192.8 |
| Dry Point | 383 | 195.0 |

| | |
|---|---|
| A.P.I. Gravity at 60°F | 51.2° |
| Specific Gravity at 60/60°F | 0.7745 |
| Weight Per Gallon at 60°F | 6.448 |
| Straight Aniline Point | 67.8°C |
| **Kauri Butanol Value | 29.4 cc |
| Tag Closed Cup Flash Point | 143°F |
| Copper Strip Corrosion | Very Slight Tarnish |

**Corrected to Toluol at 105.0 cc

Nonylphenoxypoly(ethyleneoxy)ethanol is commercially available under the trademark "IGERPAL" made by GAF Corporation. [N,N,N''-tetrakis (2-hydroxypropyl) ethylenediamine] is made commercially under the trademark "QUADROL" by Wyandotte Chemicals Corporation, Wyandotte, Michigan.

A preferred composition by weight for the cleaning and waxing composition comprises:

Table I

| Wax Content | |
|---|---|
| Parrafin | 3.0% |
| Microcrystaline | 2.0% |
| Chlorinated Solvent | 5.0% |
| Petroleum Distillate | 88.0% |
| Igerpal (Surfactant) | 1.0% |
| Quadrol (Chelating Agent) | 1.0% |

Although this composition is preferred, successful results have been obtained with the following range of compositions by weight:

Table II

| Wax Content | | | |
|---|---|---|---|
| Paraffin | 10% | 10% | 3 |
| Microcrystalline | 10% | 10% | 3 |
| Chlorinated Solvent | 38% | 38% | 5 |
| Petroleum Distillate | 40% | 40% | 87 |
| Igerpal (Surfactant) | 1% | 1% | 1 |
| Quadrol (Chelating Agent) | 1% | 1% | 1 |
| | 100 | 100 | 100 |

In addition, I have found that the addition of about 1 percent butyl cellusolve facilitates spreadability and rust inhibition.

In accordance with the invention, the cleaning and waxing composition is made by mixing the materials at room temperature without the addition of heat, thereby minimizing the labor involved. The resultant composition is clear in color.

In the preferred method of manufacture, the following steps are utilized to mix the composition:
1. Heat Petroleum Distillate to 110°F
2. Add Chlorinated Solvent
3. Heat waxes to melting point and add to solvents
4. Add Igerpal with stirring
5. Add Quadrol with stirring The aforementioned compositions provide a liquid. A paste wax composition may comprise the following compositions by weight:

Table III

| Wax Content | | | |
|---|---|---|---|
| Paraffin | 10% | 30% | — |
| Microcrystalline | 50% | 30% | 60% |
| Chlorinated Solvent | 2% | 2% | 2% |
| Petroleum Distillate | 36% | 36% | 36% |
| Igerpal (Surfactant) | 1% | 1% | 1% |
| Quadrol (Chelating Agent) | 1% | 1% | 1% |
| | 100 | 100 | 100 |

Improved gloss is obtained by adding hexogen octoate driers and ethylene glycol n-butyl ether.

Hexogen octoate driers are essentially an odorless solution of metallic salts of 2-ethyl hexoic acid in Rule 66 mineral spirits.

PHYSICAL PROPERTIES

| Product | Color Maximum Gardner | Specific Gravity Range (75°F) | G.H. Viscosity Maximum (77°F) | Pounds/ Gallon (75°F) |
|---|---|---|---|---|
| Lead 24% | 3 | 1.080–1.110 | A | 9.00–9.25 |
| Cobalt 12% | Purple | 1.035–1.065 | J | 8.12–8.87 |
| Cobalt 6% | Purple | 0.860–.885 | A | 7.16–7.37 |
| Manganese 6% | Brown | 0.875–.920 | A | 7.29–7.66 |
| Calcium 5% | 4 | 0.890–.940 | A | 7.41–7.83 |
| Calcium 4% | 3 | 0.860–.884 | A | 7.16–7.36 |
| Iron 6% | Brown | 0.890–.930 | A | 7.41–7.75 |
| Zinc 8% | 2 | 0.870–.895 | A | 7.25–7.45 |
| Rare Earth 6% | 5 | 0.850–.880 | E | 7.10–7.30 |

A typical ethylene glycol n-butyl ether is sold by The Dow Chemical Company under the designation DOWANOL EB having the following properties:

| | Dowanol EB |
|---|---|
| Molecular Weight | 118.2 |
| Boiling Point(mm.Hg. °C) | |
| 760 | 171.1 |
| 10 | 61.7 |
| Vapor Pressure at 25°C(mm.Hg.) | 0.88 |
| Pour Point °F | −103[1] |
| Specific Gravity at 25/25°C | 0.900 |
| Pounds/Gallon at 25°C | 7.49 |
| Viscosity (centistokes) at | |
| 25°C | 3.15 |
| 60°C | 1.51 |
| Flash Point °F (Open Cup) | 165 |
| Fire Point °F (Cleveland) (Open Cup) | 165 |
| Specific Heat(cal./g./°C) at 25°C | 0.56 |
| Surface Tension (Dynes/Cm.) | |
| 25°C | 27.4 |
| 75°C | 23.3 |
| Heat of Vaporization (cal./g.) at 760 mm. Hg. | 88.4 |
| Thermal Conductivity k × 10[4] (cal./cm.²/sec./°C/cm) at 60°C | 3.55 |

Typical compositions by weight are as follows:

Table IV

Wax Content

Table IV-continued

| Paraffin | 0.5 | 2 | 1 |
|---|---|---|---|
| Microcrystalline | 4.5 | 3 | 4 |
| Chlorinated Solvent | 2 | — | — |
| Petroleum Distillate | 89 | 92 | 91 |
| Igerpal (Surfactant) | 1 | 1 | 1 |
| Quadrol (Chelating Agent) | 1 | 1 | 1 |
| Cobalt Drier | 1 | 1 | 1 |
| Dowanol EB | 1 | — | 1 |
| | 100 | 100 | 100 |

In making the composition set forth in Table IV, the procedure is the same as followed with respect to the compositions of Table I and the additional components are added as the last additions.

When made in accordance with the ranges of percentages heretofore set above, it is in the form of an easily spreadable composition which can be applied by hand or otherwise to the surface being treated. The process of application as by a small cotton cloth removes the dirt.

In accordance with the invention, the resultant applied coating is then rinsed with water which functions to set the coating and produce a long-lasting finish.

In accordance with the invention, the following steps are used in applying the composition:
1. The surface is rinsed to remove grit and loose dirt. Improved results are acquired when the surfaces are dry.
2. The composition is applied uniformly by hand or otherwise to the surface being treated. Light pressure is preferably utilized in order to remove loose grit, grime, grease and dirt.
3. The surface is then rinsed with water, preferably at ambient temperature, which functions to produce a long-lasting finish. The water may be hot or cold. When the surface is in a very cold atmosphere, less water is needed to set the coating.

Although I do not wish to be bound by the theory involved, in my opinion, the step of finally rinsing with cold water serves the function of removing the solvents and helping to set the active ingredients and the wax residue.

The resultant finish takes on the characteristic of a high-gloss satin finish and there is no film which needs to be removed. The water can then be blown or wiped off. Alternatively, the water may be left on a vehicle and as the vehicle is driven, the water will be blown off by the movement of the vehicle leaving a polished finish.

It can thus be seen that in accordance with the invention, rubbing and buffing is entirely eliminated. By a slight wiping, an even better polished surface is obtained which will have a longer life.

The cleaning and protective coating composition of the present invention has the further advantage of providing rust inhibiting protective coating to the surface. The composition does not utilize any detergent and thereby obviates the adverse effects of such detergent on painted surfaces.

In order to clean surfaces that have not been cleaned for some time and which require rubbing to remove fading or which have unevenly painted surfaces or have substantial quantities of dirt, it has been found that various materials may be added which provide a slight abrasive action which will facilitate the removal of the dirt.

Where the surface being treated is a metal finish such as a car, the additives may comprise silica, baking soda and abrasive material such as coconut shells. A typical silica which may be used is commercially available under the trademark "HYFLO" by John Manville Products Corporation.

Typical compositions which are suitable for treating metal, glass and the like, which require severe cleaning, are as follows by weight:

Table V

|  |  |  |  |
|---|---|---|---|
| Silica | 20 | — | 50 |
| Baking Soda | 5 | — | 25 |
| Water | 10 | — | 10 |
| Composition of Table I | 40 | 50 | 15 |
| Ground Coconut Shells | 5 | 25 | — |
| Microcrystalline Wax | 20 | 25 | — |
|  | 100 | 100 | 100 |

The cleaning composition of Table V is applied directly on a dry surface with a soft cloth or wheel preferably in a circular motion with light pressure. A portion of the composition of Tables I and II is then applied over this composition and rinsed with water. The resultant coating produces a very long-lasting polished and protective finish which also has rust inhibiting compositions. The composition may be used on painted wood surfaces, silver, brass, copper and the like.

For treating aluminum and similar surfaces, the following compositions by weight have been found satisfactory:

Table VI

| Silica | 40 |
|---|---|
| Baking Soda | 5 |
| Composition of Table I | 50 |
| Ground Coconut Shells | 5 |

The cleaning composition including the additives is applied in the usual fashion. The surface is then rubbed or buffed and a coating of the composition of the above Table II is applied in the manner heretofore described.

I claim:

1. A cleaning and protective coating composition consisting essentially of a mixture of wax residue such as paraffin and microcrystalline wax, perchlorethylene, petroleum distillate having a boiling point ranging between 350° and 380°F., and a nonionic surfactant such as nonylphenoxypoly(ethyleneoxy)ethanol and a small amount of [N,N,N',N'-tetrakis(2-hydroxypropyl)ethylenediamine].

2. The composition set forth in claim 1 wherein said paraffin wax comprises at least 3%, said microcrystalline wax comprises at least 2%, said nonionic surfactant comprises at least 1% and said ethylenediamine comprises at least 1%.

3. The composition set forth in claim 1 including butyl cellusolve.

4. The composition set forth in claim 1 including an hexogen octoate drier and ethylene glycol n-butyl ether.

5. The method of treating a surface to clean and protect the same which comprises applying a coating of a composition consisting essentially of a mixture of wax residue such as paraffin and microcrystalline wax, perchloroethylene, petroleum distillate having a boiling point ranging between 350° and 380°F., and a nonionic surfactant such as nonylphenoxypoly(ethyleneoxy)ethanol and a small amount of [N,N,N',N'-tetrakis(2-hydroxypropyl) ethylenediamine], and thereafter setting the applied coating by treating the surface with water.

6. The method set forth in claim 1 wherein said paraffin wax comprises at least 3%, said microcrystalline wax comprises at least 2%, said nonionic surfactant comprises at least 1%, and said ethylenediamine comprises at least 1%.

* * * * *